United States Patent Office 3,385,667
Patented May 28, 1968

3,385,667
MOLYBDENUM DITELLURIDE AND HIGH-TEMPERATURE, HIGH - PRESSURE SYNTHESIS METHOD OF PREPARING SAME
Meyer Shea Silverman, Norristown, Pa., assignor to Pennsalt Chemicals Corporation, Philadelphia, Pa., a corporation of Pennsylvania
No Drawing. Filed Feb. 11, 1966, Ser. No. 526,702
4 Claims. (Cl. 23—204)

ABSTRACT OF THE DISCLOSURE

A new form of molybdenum ditelluride having a rhombohedral crystal structure is prepared by subjecting a mixture of molybdenum and tellurium to a temperature of at least about 1700° C. and a pressure of at least about 15 kilobars.

This invention relates to a new form of molybdenum ditelluride and to a method of preparing molybdenum telluride compounds. More particularly, this invention concerns a new compound of molybdenum and tellurium having a rhombohedral crystal structure and the empirical formula $MoTe_2$. The invention also concerns a unique, high-temperature, high-pressure, synthesis technique for preparing molybdenum telluride compounds.

Molybdenum ditelluride having a hexagonal crystal structure and the appearance of grey platelets or powder is known. André Morette, Compt. Rend., vol. 215, No. 3, pp. 86–8, (1942), sealed the pure elements Mo and Te in vacuo and applied heat. Combination of the elements took place with incandesence at 450° C. with $MoTe_2$ being formed at temperatures below 815° C. and $Mo_2Te_3$ formed above 815° C. The $MoTe_2$ was in the form of pulverulent, grey, hexagonal platelets, density $d_4^{15}=7.6$ grams/cc. The compound oxidized when heated in air, coloring the flame blue and emitting white clouds of tellurium anhydride. Water wet it with difficulty and had no effect thereon at ordinary temperatures. Hydrochloric acid and sulfuric acid, both cold and boiling, did not react with the $MoTe_2$, although it was attacked by dilute nitric acid and oxidized to $TeO_2$ and $MoO_3$. W. A. Morette, Ann. Chim. vol. 19, pp. 130–143, (1944), also heated Mo with Te in an evacuated sealed tube, and then removed the excess tellurium by distillation. The product $MoTe_2$, $d=7.6$ grams/cc., appeared as lamellar hexagonal crystals and was stable between 580 and 815° C.

D. Puotinen and R. E. Newnham, Acta Crystallographica, vol. 14, pp. 691–2, (1961), sealed stoichiometric quantities of elemental Te and Mo in vacuo in carbonized quartz ampules and reacted the materials at 1100° C. for several hours. The product $MoTe_2$, further purified by heat treatment in hydrogen at 850° C., had a measured density of $7.8 \pm 0.02$ g./cc. The crystal structure of the $MoTe_2$ was determined from its X-ray powder diffraction pattern using filtered $CuK \alpha$ radiation and found to consist of a hexagonal unit cell with the lattice constants: $a=3.519$ A. and $c=13.964$ A., with a calculated specific gravity of 7.78 g./cc.

O. Knop and R. D. MacDonald, Canadian Journal of Chemistry, vol. 39, pp. 897–904, (1961), sealed a stoichiometric mixture of Mo and Te powders in an evacuated quartz tube which was then held for 16 hours at 460° C. The powder was removed, crushed, mixed thoroughly, resealed and annealed at 600° C. for 48 hours. The product $MoTe_2$ was a loose, dark-grey powder of uniform appearance consisting of very fine needles and platelets, density $d_4^{25}=7.681$ g./cc. X-ray powder diffraction patterns were taken with filtered $CuK \alpha$ radiation; all lines could be indexed on a hexagonal unit cell. (This pattern, which will be reproduced in part hereinafter, has been adopted as a standard for hexagonal $MoTe_2$ and given the designation ASTM 15-658. Calculated lattice parameters were $a=3.5182$ A., and $c=13.9736$ A.; the calculated density was 7.784 g./cc.

L. H. Brixner, Journal Inorganic Nuclear Chemistry, vol. 24, pp. 257–65, (1962), prepared $MoTe_2$ in single crystal form by means of transport reactions using bromine as the transport agent. Crystallographic data was taken on the basis of single crystal patterns using K $\alpha$ radiation of $Cu(\lambda=1.5418$ A). Lattice parameters were $a=3.517$ A. and $c=13.949$ A., which constants were in good agreement with those of Puotinen and Newnham, and Knop and MacDonald, supra. The $MoTe_2$ exhibited good semi-conducting properties having an electrical resistivity measured at 25° C. and at −196° C. of 8.5 and $1.34 \times 10^3$ ohm-cm., respectively.

It is also reported by the U.S. Department of Commerce, Office of Technical Service, Bulletin AD 265,121 (1961) that small single crystals of $MoTe_2$ were obtained by chemical transport reaction with bromine as the transport agent. The $MoTe_2$ was sintered for 2 days at 600° C. in vacuo and its density was then 6.85 g./cc. It was found to be thermally stable only up to 600° C.

In accordance with the present invention, it has now been discovered that molybdenum ditelluride having a rhombohedral crystal structure as described herein is prepared by subjecting, in the preferred embodiment, a mixture of elemental molybdenum and elemental tellurium to extreme temperatures, while simultaneously applying high pressures thereto to avoid vaporization of the elements. In alternative embodiments of the process, the starting materials used can be compounds which are precursors of the new molybdenum ditelluride produced by the application of heat and pressure, i.e. those compounds which form the $MoTe_2$ in situ, for example $MoO_3+Te$, $Mo+TeO_2$, $Mo_2Te_3+Te$, and the above-described hexagonal crystal form of $MoTe_2$. The rhombohedral crystal form of $MoTe_2$ prepared in accordance with the method of this invention is a charcoal-grey, highly reflective, soft, polycrystalline material.

As previously stated, the practice of this invention requires the application of an elevated temperature to convert the raw materials described above into the new rhombohedral crystalline form of molybdenum ditelluride. A temperature of at last about 1700° C. is necessary, at least about 2000° C. being preferred. The practical upper temperature limit is about 2500° C. since no advantage is achieved by going higher. The preferred range of operating temperatures is from about 2000° C. to about 2200° C. The product $MoTe_2$ will contain some hexagonal crystalline $MoTe_2$ in addition to the desired rhombohedral crystal form when the synthesis is conducted in the lower range of temperatures, with an increase in temperature favoring the yield of the rhombohedral form. It has been found that at temperatures above about 2100° C., the product is essentially the rhombohedral crystal form.

The pressure used to maintain the feed materials (i.e., the mixture of molybdenum and tellurium, or mixture of molybdenum and a precursor of tellurium, or mixture of tellurium and a precursor of molybdenum, or mixture of precursors that yield molybdenum ditelluride in situ) in a non-vapor state during the high temperature reaction is at least about 15 kilobars (one kilobar equals 986.92 atmospheres), preferably at least about 25 kilobars and more preferably at least about 45 kilobars. Pressures in the range of about 60 kilobars have been employed with good results, however, no apparent advantage is gained by using pressures in excess of about 80 kilobars.

The relative amounts of the aforesaid raw materials in the mixture subjected to the process of this invention are such as to provide an atomic ratio of molybdenum to tellurium in the charge generally within the range of about 1:2 to about 1:4. Although an excess of tellurium greater than the 4 moles Te to one mole Mo is possible, no advantage is gained, and if a purified product is desired more unreacted tellurium must be removed. The preferred atomic ratio of Mo to Te is within the range of from about 1:2 to about 1:3, and most preferable is a ratio of 1:2.1 to 1:2.5.

The reaction period, which is not critical, may vary from about 1 minute to 24 hours, although the reaction generally is completed in no more than about 5 minutes. Yields of from about 75% to 100% of the rhombohedral crystal form of $MoTe_2$ are obtained without difficulty in the practice of this process with reaction periods of from about 2 to 5 minutes. Unreacted tellurium, which is relatively volatile, may be removed from the product, if so desired, by vacuum sublimation.

The apparatus used in the illustrative examples that follow is similar to that developed at the National Bureau of Standards and described in "Compact Multianvil Wedge Type High Pressure Apparatus," E. C. Lloyd, U. O. Hutton and D. P. Johnson, Journal of Research of the National Bureau of Standards, vol. 63C, No. 1, July–September 1959, pp. 59–64. In place of the 9/16" tetrahedral sample holders used in the above reference, 5/8" holders with ½" anvil faces were employed in the examples which follow, and alternatively, 5/16" holders were used with ¾" anvil faces. A polyester film ("Mylar," manufactured by DuPont Company) was used between the anvil assemblies and the polytetrafluoroethylene sheet. Additionally, a 0.003" wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 82 kilobars. In all of the preparations, a thin sleeve of spectroscopic grade graphite was used as the heating element around the sample, and end plugs of the same material isolated the sample from the platinum or silvered tabs that carried the current from the anvils to the heating sleeve. Temperature calibrations were done by measuring the electrical power input required to obtain reaction temperatures which were indicated by a Chromel-Alumel thermocouple, the tip of which was in good contact with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately ±50° C., but the relative differences among the temperature levels of the experiments are believed to be quite reliable.

In each preparation the sample was first compressed in the high pressure apparatus, then heated and held at the desired conditions for a measured period of time. The high pressure was maintained until the power was turned off and the sample had cooled to nearly ambient temperature. Cooling was very rapid in all cases. The product was removed as a compressed cylindrical pellet.

Example 1

A mixture of powdered molybdenum and powdered tellurium (99.8% and 99% purity, products of Fisher Scientific Company), the ratio in said mixture being one gram-mole of molybdenum to 2.1 gram-moles of tellurium, is charged to the above-described tetrahedral anvil apparatus. The mixture is compressed to a pressure of 45 kilobars and then rapidly heated to 21100° C. where it is held for 3 minutes. The electrical power is switched off to quickly quench the reaction. After a cooling period of about 5 minutes, the pressure is released to atmospheric and the product is removed as a cylindrical pellet which is easily converted by crushing into a form having the appearance of a fine, charcoal-grey powder. The product is elementally analyzed with the results: Mo, 27.7%, Te, 72.3%, atomic ratio of Te/Mo=1.96. The product is thus essentially of the empirical formula $MoTe_2$ which theoretically consists of Mo, 27.5%, Te, 72.5%, atomic ratio of Te/Mo=2.0.

The X-ray powder diffraction pattern of the essentially rhombohedral crystalline molybdenum ditelluride prepared above is determined using filtered $CuK\alpha$ radiation; the pattern is compared to the X-ray powder diffraction pattern of molybdenum ditelluride having the hexagonal crystal structure as reported by Knop and MacDonald, supra. The comparison is set forth in Table I, below, where I values are the relative intensities of the individual lines, relative to the strongest line in the pattern which is given the value of 100 and "d" in angstrom units is the interplanar distance between lattice planes according to the "Bragg Equation." The lines of the pattern of the new form of $MoTe_2$ are indexed on a rhombohedral unit cell.

TABLE I.—X-RAY POWDER DIFFRACTION PATTERNS OF MOLYBDENUM DITELLURIDES

| Hexagonal Form, ASTM 15-658 | | Rhombohedral Form of This Invention | |
|---|---|---|---|
| d | I | d | I |
| 6.92 | 20 | 6.9 | 75 (strong). |
| 3.47 | 14 | 3.02 | 25 (weak). |
| 3.04 | 40 | 2.83 | 100 (very strong). |
| 2.547 | 100 | 2.77 | Do. |
| 2.056 | 35 | 2.57 | 50 (medium). |
| 1.840 | 30 | 1.80 | Do. |
| 1.757 | 40 | 1.74 | Do. |
| 1.737 | 40 | 1.555 | 25 (weak). |
| 1.445 | 16 | | |
| 1.235 | 20 | | |
| 1.116 | 14 | | |

Lattice Constants (in A.)

| Hexagonal $MoTe_2$ | Rhombohedral $MoTe_2$ |
|---|---|
| a=3.5182 | a=3.70 |
| c=13.9736 | c=20.71 |

It is well known that X-ray spectographs uniquely characterize crystalline structure, and therefore, the above X-ray diffraction pattern for the new rhombohedral $MoTe_2$ is a definitive description of the compound.

The electrical resistivity of the rhombohedral crystalline $MoTe_2$, which is measured at ambient temperature (about 25° C.) with a standard volt-ohmeter across two separate axes of the cylindrical pellet as recovered from the high pressure synthesis apparatus, is less than the electrical resistivity of the hexagonal crystalline form. The dimension of said $MoTe_2$ pellet are: radius=2 mm., length=1.5 mm. The electrical resistivity of the new compound is an anisotropic value, i.e., $2 \times 10^{-1}$ ohm-cm. as measured normal to the curved surface of the pellet (transverse axis) and $7.3 \times 10^{-1}$ ohm-cm. along the longitudinal axis of the cylinder. The density of the rhombohedral $MoTe_2$ is determined as 7.35± 0.03 g./cc. using a Bethlehem Micro-Density balance, comparing the weights of the sample in air and in toluene.

Examples 2–11

The procedure described in Example 1 is followed using the synthesis conditions summarized in Table II below

TABLE II.—SYNTHESIS CONDITIONS

| Example No. | Pressure, kilobars | Temperature, ° C. | Time, minutes |
|---|---|---|---|
| 2 | 25 | 1,035 | 5 |
| 3 | 60 | 1,905 | 5 |
| 4 | 60 | 2,400 | 1.5 |
| 5 | 45 | 2,045 | 3 |
| 6 | 50 | 2,020 | 3 |
| 7 | 45 | 1,995 | 3 |
| 8 | 45 | 1,975 | 3 |
| 9 | 45 | 1,935 | 3 |
| 10 | 60 | 2,120 | 1 |
| 11 | 60 | 2,345 | 4 |

The products are analyzed by their X-ray diffraction powder patterns which show that the molybdenum ditelluride prepared in Example 4 consists essentially of the rhombohedral crystal form. The product of Example 2, however, is essentially unreacted Mo and Te because of the ineffectively low reaction temperature. The products of the other examples are comprised of the new rhombohedral form together with some of the hexagonal crystal form of molybdenum ditelluride.

The new form of molybdenum ditelluride embodied herein is useful as a semi-conducting material in electronic devices and as a thermoelectric material for temperature controlling devices having no moving parts. The rhombohedral crystalline form and the hexagonal form can be mixed in varying proportions to obtain materials with a wide range of electrical properties but with essentially the same chemical composition. Molybdenum ditelluride is also useful as a lubricant additive, e.g., in solid form mixed with synthetic resins and the like for bearing surface protection, or mixed with natural and syntheic oils or greases for a variety of lubricating tasks.

I claim:

1. A method for preparing molybdenum ditelluride which comprises subjecting a mixture of molybdenum and tellurium to a temperature of at least about 1700° C. and a pressure of at least about 15 kilobars.

2. The method of claim 1 wherein the temperature is at least about 2000° C.

3. The method of claim 2 wherein the pressure is at least about 25 kilobars.

4. Molybdenum ditelluride having a rhombohedral crystal structure and the X-ray diffraction pattern with the lines essentially as follows.

| $d$, A.: | I |
|---|---|
| 6.9 | 75 |
| 3.02 | 25 |
| 2.83 | 100 |
| 2.77 | 100 |
| 2.57 | 50 |
| 1.80 | 50 |
| 1.74 | 50 |
| 1.555 | 25 |

No references cited.

OSCAR R. VERTIZ, *Primary Examiner.*

H. S. MILLER, *Assistant Examiner.*